Sept. 15, 1959 D. E. QUINLAN 2,904,642

GAMMA CORRECTION CIRCUIT

Filed Nov. 8, 1955

INVENTOR.
DONALD EARL QUINLAN
BY Darly & Darly
ATTORNEYS

United States Patent Office 2,904,642
Patented Sept. 15, 1959

2,904,642

GAMMA CORRECTION CIRCUIT

Donald Earl Quinlan, Clifton, N.J., assignor to Allen B. Du Mont Laboratories, Inc., Clifton, N.J., a corporation of Delaware Application November 8, 1955, Serial No. 545,596

4 Claims. (Cl. 179—171)

This invention relates to electrical or electronic signal amplifier circuits and particularly to the selective suppression of noise in gamma correction circuits.

For convenience of explanation, the instant invention will be discussed in terms of television, but the principles herein disclosed are readily applicable to other fields.

It is generally desirable that the overall effect of amplifying devices be linear, i.e., the original picture should be accurately reproduced in the proper shades of black, gray and white. In color television it is desirable that instead of black, gray and white, the true colors are reproduced; while in the field of sound the elements involved would be overtones, undertones, and harmonics.

Unfortunately, the pick-up devices (cameras, microphones, films, etc.) are usually non-linear and thus introduce some distortion. Reproducing devices (television picture tubes, loudspeakers, etc.) generally have their own inherent non-linear characteristics which may either compensate for or aggravate those in the pick-up device. In order for the final result to be an exact but amplified replica of the original, it is usually necessary to introduce compensating or pre-distorting circuits known as "gamma correction circuits." These selectively amplify or compress certain portions so that overall amplification is linear. If the circuits involved are such that the excursions representing black portions of the resultant picture are stretched, the effect is known as "black-stretch." Conversely, if the excursions of the input signal representing white portions of the picture are stretched, this operation is known as "white-stretch." Similar results may be obtained in the field of sound where frequencies or volume may be "stretched" or selectively amplified. Most of these systems, unfortunately, have inherent disturbances or distortions which are also amplified as a result of the desired stretch, and the benefits of selective amplification are eventually limited by the amount of ultimate distortion which can be tolerated.

It is therefore the principal object of my invention to provide an improved gamma correction circuit.

It is another object to provide a gamma correction circuit which limits disturbances, and still provides the benefits of selective amplification.

It is still another object to provide a gamma correction circuit which limits disturbances only within predetermined areas.

Figure 1:
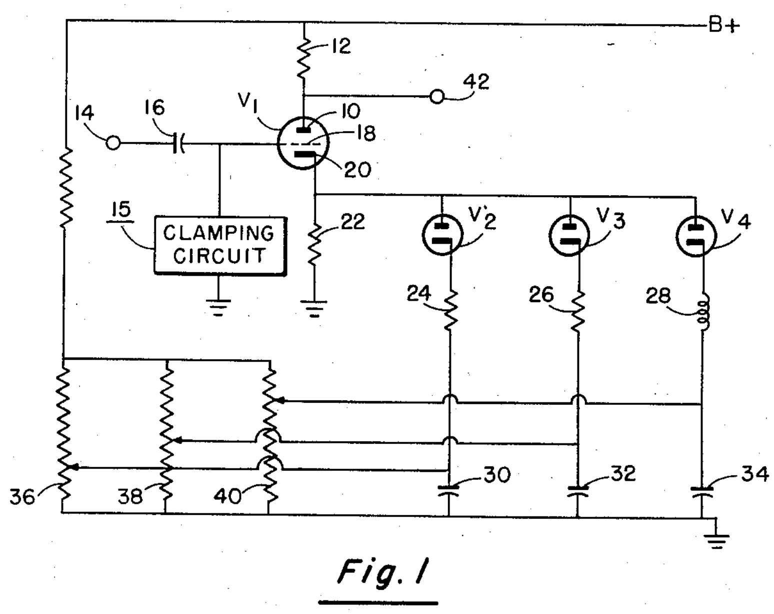

These objects and others will be understood from the following specification, read in conjunction with the drawings, in which, Figure 1 is a schematic diagram of a gamma correction circuit embodying my invention; and Figures 2, 3, 4 and 5 depict input and output waveforms utilized in the explanation of the operation of the circuit.

There is inherent in all electrical signals a disturbance known as "noise." This term originated in radio, and its usage has been extended to television although in this case "noise" manifests itself as spots, patches, streaks or patterned areas in the picture. As a portion of the input signal is stretched or selectively amplified, inherent noise is also amplified. To further complicate matters, noise covers a wide range of frequencies, and since most circuits normally act to attenuate high frequencies, a deliberate compensatory attempt is made to provide circuits which readily pass the high frequency components. Thus, high frequency noise is always present. In television the effects of high frequency noise become worse during stretching because such noise shows up as bright twinkling pinpoints or "snow."

Composite television signals contain low and intermediate frequencies which produce coarse detail such as the trunk and boughs of a tree. The television signals also contain high frequencies which represent fine detail of the picture, such as the leaves and bark of the tree. During a light portion of the picture, say a daylight view of the tree, it is desirable to see the bark, leaves and other fine detail produced by the high frequency video signal; and the bright pinpoints caused by high frequency noise are not particularly noticeable against the light background. Thus high frequencies are desirable during light portions of the picture. However, during a dark portion of the picture, for example a view of the tree at night, the leaves, bark and other fine detail which would be produced by high frequency video signals cannot be discerned, while the bright twinkling pinpoints produced by high frequency noise are objectionable. Therefore it would be advantageous to eliminate high frequencies during the dark portions of the picture, while maintaining them during the light picture portions.

I accomplish this result by incorporating into the gamma correction circuit an element which is sensitive to high frequencies. This is located in the portion of the circuit which is operative only during dark portions of the picture. When high frequencies occur during the dark portion, my high frequency sensitive element acts to eliminate their effects, while remaining inoperative during the other lighter portions of the picture.

Referring now to Figure 1, there is shown an electronic amplifier tube $V_1$ having an anode 10, and an anode load resistor 12 connected between anode 10 and B+. An input terminal 14 is connected through blocking capacitor 16 to control grid 18, while clamping circuit 15, establishes a black level in a manner well known in the art. Cathode 20 is connected through cathode load resistor 22 to ground. Connected in parallel or shunt with cathode load resistor 22 are a first diode $V_2$, intermediate diode $V_3$, and a last diode $V_4$, whose function and associated circuitry will be hereinafter explained. The anodes of these diodes are connected together, and to cathode 20. The cathodes of these diodes are connected to ground through respective impedances 24, 26 and 28, and capacitors 30, 32 and 34. Thus, when none of the diodes are conductive, the effective cathode load impedance $R_k$ is the value of cathode load resistor 22. As the various diodes become conductive, their circuits form paths which are in parallel with resistor 22, and the shunting effect reduces the effective cathode load impedance, $R_k$. Adjustable voltage dividers 36, 38 and 40 are connected between B+ and ground, and respective sliders are connected to respective points in the cathode circuits of respective diodes. Clamp circuit 15 and the settings of potentiometers 36–40 determine the points at which the various diodes become conductive, while the capacitors provide paths to ground for alternating current signals in the diodes. While tube $V_1$ is shown as a triode for convenience, it is within the scope of those skilled in the art to use other types.

Figure 2:
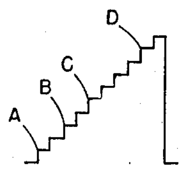

Assume now input terminal 14 has applied to it, the linear staircase waveform of Figure 2. As the first of the positive going steps A of this waveform is applied to control grid 18, an amplified version appears at the output terminal 42 connected to anode 10.

Figure 3:
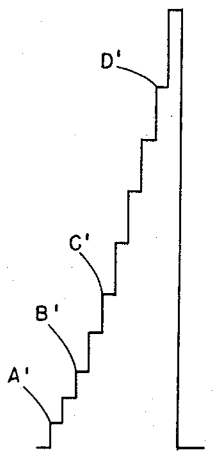

Figure 3 depicts the output signal as a positive going waveform for convenience of comparison. However, as is well known in the art, the output would actually be negative going. As additional steps A—B of the staircase waveform of Figure 2 are applied to the control grid, an amplified replica A′—B′ appears at the output terminal 42. When the amplitude of the input waveform approaches the value indicated at B, the current flowing through tube $V_1$ develops across resistor 22 a voltage which is great enough to cause diode $V_2$ to become conductive and shunt cathode resistance 22. When this occurs, the effective cathode impedance $R_k$, of tube $V_1$, is reduced because of the additional parallel connection through diode $V_2$, resistance 24 and potentiometer 36. This decreased resistance allows a larger current to flow through tube $V_1$, and simultaneously permits a larger portion of the output signal to appear across anode load resistance 12. The net result is that a greater signal appears across anode load resistor 12, i.e., the gain of the amplifier is increased. This is shown in Figure 3 by comparing portion A′—B′ with B′—C′ for equal steps of the input waveform of Figure 2.

At point C the current flowing through cathode load resistor 22 has developed therein a voltage whose amplitude is great enough to cause diode $V_3$ to become conductive. This additional shunt path across cathode load resistor 22 further decreases the effective cathode load impedance $R_k$, providing a greater gain for tube $V_1$ in the same manner as previously shown. This can be seen by comparing portion C′—D′ with other portions of Figure 3.

As control grid 18 is made increasingly positive a point D is reached where the last diode $V_4$ also becomes conductive, and the additional shunting of cathode resistor 22 again increases the gain of the amplifier.

Points B, C and D are individually determined by the settings of potentiometers 36, 38 and 40 respectively, as previously mentioned.

It may now be seen that an input signal, such as shown in Figure 2, has been selectively "black-stretched" to the waveform shown in Figure 3. As will be apparent to those skilled in the art, the circuits may be readily modified to provide "white-stretch" or compression, rather than stretching.

The last diode $V_4$ of Figure 1 has the greatest effect on the black-stretch. As has been shown, $V_4$ is the last diode to become conductive in response to a positive going signal, and the first one to become non-conductive as the amplitude of the signal decreases. It is during the operation of diode $V_4$ (dark picture portions) that the effects of high frequency noise become particularly objectionable, as previously explained.

In order to eliminate the bright pinpoints produced by high frequencies during dark picture portions, I introduce an inductance 28 into the cathode circuit of diode $V_4$ as shown in Figure 1. Below its resonant frequency, inductance 28 has a low impedance and acts to reduce the effective cathode impedance, $R_k$, by shunting action as previously described. At its resonant frequency, however, the impedance of inductance 28 is very high and provides very little shunting effect on the effective cathode impedance $R_k$. Above this frequency the characteristic of the amplifier circuitry cuts off the effect of all higher frequencies, noise and video alike.

Figure 4:
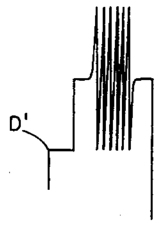
Figure 5:
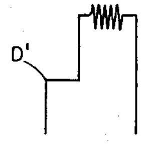

Thus, for amplitudes above D and D′ of Figures 2–5, the picture is either black or a very dark shade of gray. If either high frequency noise, or high frequency video is impressed on input terminal 18, the impedance of the circuit of the last diode $V_4$ increases. The reduced shunting effect of the diode $V_4$ circuit increases the effective cathode impedance $R_k$ and the gain of tube $V_1$ decreases. The effects of high frequency signals during the dark portion of the picture is illustrated in Figures 4 and 5 which are enlarged views of the upper portion of the waveform shown in Figure 3. Without my invention a burst of high frequency, noise or video would be amplified as shown in Figure 4. The upper excursions would tend to cause the picture to become even darker, but since this "blacker than black" is physically impossible, these excursions have no effect. The lower or negative excursions of the burst of high frequency noise cause bright pinpoints which, because of the contrast with the surrounding black areas, seem much brighter than they deserve to be.

Figure 5 illustrates the improvement due to my invention. When a burst a high frequency occurs in my circuit, the overall amplification of tube $V_1$ is decreased. This lowers the black level somewhat, and simultaneously decreases the amplitude of the excursions. The "blacker than black" portion still produces no effects, and the lower excursions are so severely limited that they do not cause any appreciable local brightening of the picture. Thus, my invention eliminates the objectionable twinkling introduced into a dark picture by high frequency noise, and still permits the black stretch that is required to achieve overall linearity. The only discernible difference is the absence of pinpoints of light. Coarser detail in dark picture portions, as represented by medium and low frequencies, is reproduced to the full capacity of the circuit. When the amplitude of the input signal is reduced below D, diode $V_4$ and inductance 28 are completely out of the circuit, and again the circuit functions in its normal manner.

Since the foregoing specification is descriptive only, the circuit and principles disclosed therein are applicable in other fields. I desire, therefore, to be limited not by the preceding explanation, but by the claims granted to me.

What is claimed is:

1. A circuit for eliminating high frequency disturbances from a stretched signal, comprising: an electron discharge device having an input electrode and an output electrode; stretching means comprising a diode connected to said output electrode whereby when an input signal is applied to said input electrode a distorted replica of said input signal having predetermined distortion appears at said output electrode; and means comprising an inductance connected in series with said diode, to change the amount of distortion of said replica when the frequency of said input signal reaches a predetermined value.

2. A circuit for eliminating high frequency disturbances from a stretched signal, comprising: an electron discharge device having an input electrode and an output electrode; stretching means, comprising a plurality of parallel connected, similarly poled diodes connected to said output electrode, whereby when an input signal is applied to said input electrode a distorted replica of said input signal having predetermined distortion appears at said output electrode; and means, including an inductance connected in series with the last diode of said plurality, to change the amount of distortion of said replica when the frequency of said signal is changed.

3. A circuit for eliminating high frequency disturbances from a stretched signal, comprising: an electron discharge device having an input electrode and an output electrode; stretching means comprising a plurality of parallel connected, similarly poled diodes connected to said output electrode whereby an input signal applied to said input electrode produces at said output electrode a distorted replica of said input signal having predetermined distortion; and means comprising an element sensitive to high frequencies connected in series with the last diode of said plurality to change the amount of distortion of said replica when the frequency of said signal is changed, said element including an inductance having a resonant frequency substantially equal to the frequency of the disturbances to be eliminated.

4. A gamma correcting amplifier capable of suppressing high frequency noise during black-stretch, comprising: an electron tube having an anode, a control grid, and a cathode; a source of direct voltage having a positive terminal and a negative terminal; an anode load resistance connected between said anode and said positive terminal; a cathode load impedance connected between said cathode and said negative terminal; an output terminal connected to said anode; stretching means progressively varying the gain of said amplifier at predetermined successive operating points of the input signal of said amplifier, said stretching means comprising a plurality of diodes, each connected to said cathode; a corresponding plurality of diode load impedances connected in series with said diodes respectively; and a plurality of bias voltage sources connected to said diodes respectively, to allow said diodes to become successively conductive at said operating points thereby shunting the cathode load impedance; and means causing the diode load impedance connected to the last one of said plurality of diodes, said impedance comprising an inductance, to temporarily reduce the shunting effect of said last diode on the occurrence of high frequencies.

References Cited in the file of this patent

UNITED STATES PATENTS

| | | |
|---|---|---|
| 2,222,933 | Blumlein | Nov. 26, 1940 |
| 2,434,155 | Haynses | Jan. 6, 1948 |
| 2,583,345 | Schade | Jan. 22, 1952 |
| 2,597,630 | French | May 20, 1952 |
| 2,697,758 | Little | Dec. 21, 1954 |
| 2,701,303 | Wells | Feb. 1, 1955 |
| 2,731,557 | Clayden | Jan. 17, 1956 |
| 2,748,278 | Smith | May 29, 1956 |
| 2,773,980 | Oliver | Dec. 11, 1956 |
| 2,792,496 | Rhodes | May 14, 1957 |

FOREIGN PATENTS

| | | |
|---|---|---|
| 143,356 | Australia | Sept. 12, 1951 |
| 502,406 | Canada | May 11, 1954 |